United States Patent Office 3,197,454
Patented July 27, 1965

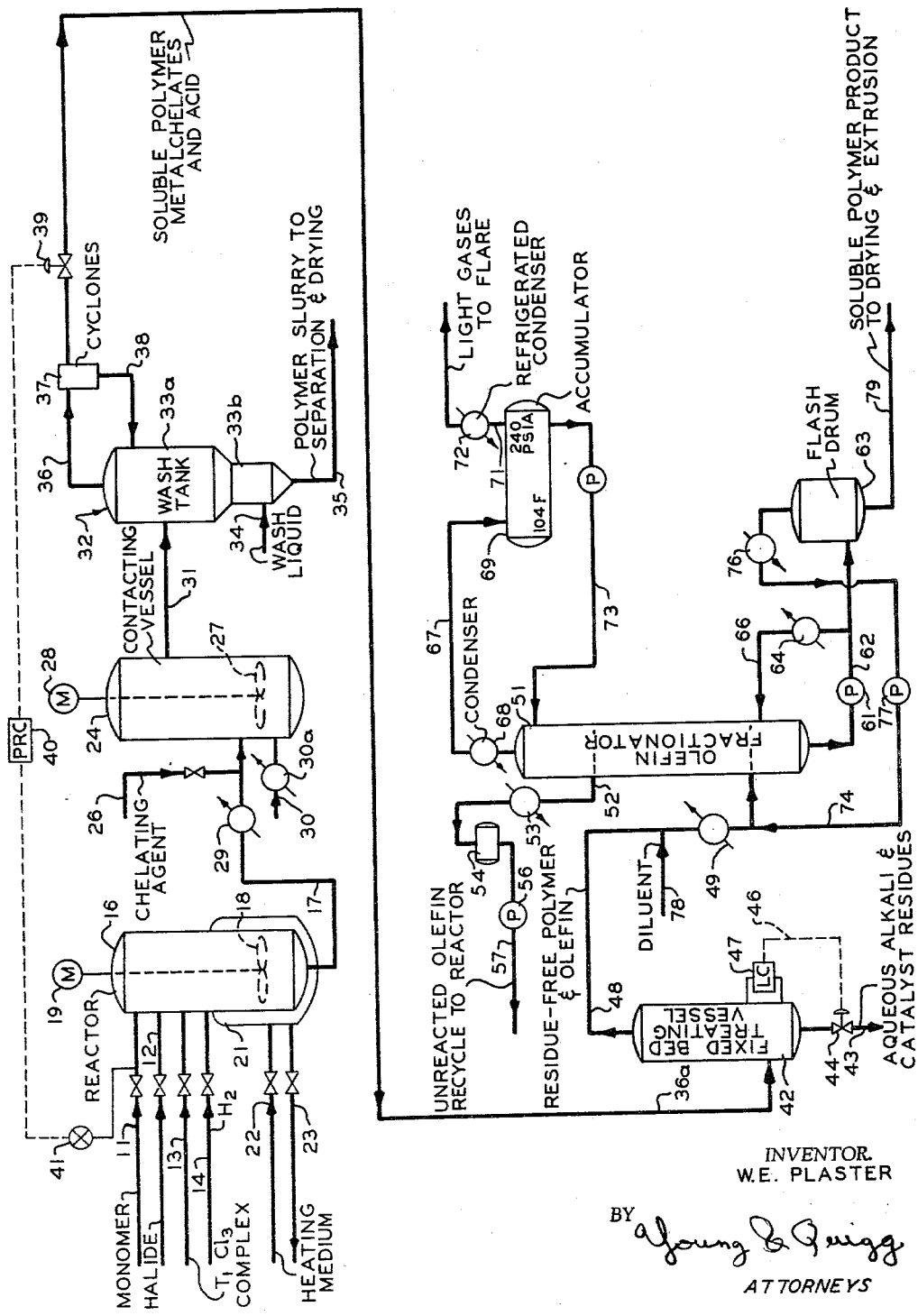

3,197,454
REMOVAL OF CATALYST RESIDUES FROM OLEFIN POLYMERS
William E. Plaster, Bartlesville, Okla., assignor to Phillips Petroleum Company, a corporation of Delaware
Filed Apr. 2, 1962, Ser. No. 184,438
6 Claims. (Cl. 260—93.7)

This invention relates to the separation of olefin polymers from a polymerization zone effluent. In one aspect it relates to an improved method of separating soluble olefin polymers from catalyst residues prepared by mass polymerization. A problem oftentimes arises with respect to the color and/or ash content of polymeric material produced by catalytic polymerization with two or more component catalyst systems where one component is an organometal compound, metal hydride or a Group I, II, III metal, and the other component is a Group IV to VI or VIII metal compound. Mono-1-olefins, such as propylene, polymerize to form a structure which is highly crystalline and is generally referred to as isotactic polypropylene. These resulting polymers were discolored to the extent that they were unsatisfactory for use generally in molded articles. The high proportion of polyolefin material which is ultimately used in molded products accentuates this color problem.

Further, such polymers produced with the specified catalysts oftentimes have an undesirably high ash content. This "ash content" refers to inorganic constituents which are present in the polymer in unidentified form and which, when burned, yield ash. One important objection to high ash content resides in its adverse effect upon the electrical properties of the polymer, for example, conductivity, dielectric constant, dissipation factor, and the like.

Removal of the polymer diluent is not very difficult, but removal of the catalyst, and/or catalyst decomposition products has posed serious problems. These impurities, if allowed to remain with the polymer product, contribute to the deficiencies in desirable properties outlined above.

Recent prior art has taught the treating of a solution of the polymeric material with a chelating agent, which apparently ties up the metal constituents of the catalyst residues, and provides molded products of improved color and reduced ash content where the catalyst used in the polymerization incorporates a Group IV or VI metal compound.

In one process proposed for the polymerization of mono-1-olefins, the olefin is polymerized in a mass system wherein the olefin is in liquid phase and the polymerization is conducted without the addition of more than small amounts of an inert diluent. In such processes, the only inert diluent present in the polymerization zone is that which may be present in the feed or that which may be used in the introduction of the catalyst. Because no extraneous diluent is present when using the mass polymerization technique, the polymer often contains a larger quantity of catalyst residues than when the same system is used in the presence of a diluent. The conventional method employed to remove catalyst residues from polymers prepared by these processes is to initially separate the polymer from the diluent or, in the mass polymerization process, from the monomer.

The prior art processes disclose means for recovery of the slurry of solid polymer in monomer, but make no provision for the polymer soluble in the monomer. Studies indicate that a significant percentage of the polyolefin produced will be soluble polymer. Economics dictates that this potentially valuable polymer stream be recovered.

Accordingly, an object of this invention is to provide an improved process for the recovery of polymers of mono-1-olefins from a polymerization zone effluent.

Another object is to provide a process for recovery of the soluble polyolefins prepared in a mass polymerization system free of contaminants.

A further object is to provide means for separating soluble olefin polymer by treating a stream containing liquid monomer of stripped solid polymer so as to recover the polymer soluble in the monomer free from catalyst residues.

A yet further object is to provide an increased production of polyolefins of desirable color and low ash content prepared by mass polymerization.

Other aspects, objects, and the several advantages of the invention will be apparent from a study of the disclosure, the drawing, and the appended claims.

A slurry of finely divided olefin polymer particles is contacted vigorously with a chelating agent, typically one of the dicarbonyl compounds, such as acetyl acetone, which forms metal chelates that are soluble in the liquefied monomer. Washing of the slurry with a low boiling hydrocarbon diluent, produces a purified solid polyolefin slurry bottoms product, and an overhead liquid comprising soluble polyolefin, the metal chelates, excess chelating agent, hydrochloric acid and liquid diluent. It is this latter mixed stream which is subjected to the novel purification step.

According to my invention the mixed stream is passed through a fixed bed treating vessel, preferably containing solid alkali metal hydroxide, either NaOH or KOH. Thus, the metal chelates, chelating agent, and HCl all react with the caustic, with a water solution being formed, which is continuously drained from the bottom of the vessel, at a controlled rate, containing the metal chelate neutralization product, the chelating agent-caustic salt, and NaCl from the acid neutralization reaction. The water formed in the treating vessel is drawn off and partly leaches the caustic bed.

These results overhead a soluble polymer stream, but now substantially free of contaminants, with a minimal amount of water being carried to the olefin fractionation tower, wherein the unreacted olefin and diluent is separated from the polyolefin and recycled to the reactor and wash tank. Concurrently, soluble polymer product is passed to drying and extrusion steps.

More specifically, a process for polymerizing propylene to form an improved solid propylene homopolymer having a flexural modulus value of at least 200,000 p.s.i.a. and a melt index value in the range 0.1 to 10.0 is provided which comprises polymerizing propylene in a mass system at a temperature in the range 105° to 130° F. and at a pressure sufficient to maintain liquid phase conditions in the presence of a catalyst formed by admixing (a) a dialkylaluminum halide compound wherein the alkyl groups contain from 1 to 12, inclusive, carbon atoms and (b) a titanium trichloride complex, and preferably in the presence of from 0.15 to 0.40 mole percent hydrogen in the liquid mono-1-olefin phase, and recovering said polypropylene.

As mentioned hereinbefore, the polymers which are treated in accordance with the present process are prepared from mono-1-olefins. The mono-1-olefins contain at least 2 carbon atoms and preferably not more than 5 carbon atoms. Examples of suitable monomers include ethylene, propylene, 1-butene, 1-pentene, 3-methyl-1-butene, and the like. In a preferred embodiment of the invention, propylene is utilized as the monomeric material. It is to be understood that mixtures of two or more monomers can be employed in the polymerization. Examples of such copolymers include ethylene-propylene, and ethylene-butene-1.

Since a wide variety of catalyst systems can be employed in the polymerization, it is not intended to limit the invention to any particular catalyst system. Catalyst systems suitable for use in the polymerization are those which are capable of polymerizing a mono-1-olefin in a mass polymerization and under conditions such that solid polymer in particle form is produced. Catalyst systems suitable for use can be broadly defined as comprising an organometal compound, metal hydride, or a Group I, II or III metal of the periodic classification of the elements according to Mendeléeff and the other component is a Group IV to VI or VIII metal compound. A particularly suitable catalyst is one which comprises (a) a compound having the formula $R_nMX_m$, wherein R is an alkyl, cycloalkyl or aryl radical or combiantions of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from zero to 2, inclusive, and the sum of $m$ and $n$ is equal to the valence of the metal M, and (b) a halide of a metal of Group IV–A, V–A, VI–A or VIII. The hydrocarbon radicals which can be substituted for R in the aforementioned formula include radicals having up to about 20 carbon atoms each. Radicals having 10 carbon atoms or less are preferred.

Examples of compounds corresponding to the formula $R_nMX_m$ which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, methylaluminum dichloride, dimethylaluminum dichloride, ethylaluminum dichloride, diethylaluminum chloride, di-n-butylaluminum bromide, isooctylaluminum diiodide, di-n-propylgallium fluoride, dicyclohexylgallium chloride, diphenylgallium bromide, tetradecylgallium fluoride, eicosylgallium dibromide, diphenylindium chloride, octylindium difluoride, cyclohexylindium dibromide, 2-cyclohexylethylgallium dichloride, di-(3-phenyl-1-methylpropyl)indium fluoride, 2-(3-isopropylcyclohexyl)ethylthallium dibromide, and the like.

The metal halide component of the catalyst system is preferably a halide of a Group IV–A metal, i.e., titanium, zirconium, hafnium and germanium. However, it is to be understood that halides of metals of the other groups specified above, such as vanadium, molybdenum, tungsten, cobalt, and iron can also be employed in the catalyst system. The trichlorides, trifluorides, tribromides, and triiodides, as well as the tetrachlorides, tetrafluorides, tetrabromides and tetraiodides of the various metals, can be used in the catalyst system, either individually or as mixtures of two or more of the metal halides. It is usually preferred to employ a trichloride, such as titanium trichloride, in the polymerization.

The preferred catalyst system employed in the polymerization comprises a dialkylaluminum chloride and titanium trichloride, the latter compound preferably being prepared by reduction of titanium tetrachloride in the presence of aluminum. The reduction product is preferably a complex having the formula $3TiCl_3 \cdot AlCl_3$. The reduction reaction is usually carried out at an elevated temperature, for example, at a temperature in the range of 360 to 600° F., preferably from 375 to 450° F.

The amount of catalyst employed according to the invention in the polymerization of olefins can vary over a rather wide range and will depend at least to a certain degree upon the particular catalyst system used. The amount of dialkylaluminum halide used should be at least $1.0 \times 10^{-4}$ grams/gram of monomer and can be as much as $25 \times 10^{-4}$ grams/gram of monomer. The amount of titanium trichloride complex employed will generally be in the range between $1.5 \times 10^{-4}$ and $10 \times 10^{-4}$ grams/gram of monomer.

In general, the mol ratio of the organometal compound to the metal salt falls within the range of 0.02 to 5 mols. When employing the preferred catalyst system, the mol ratio of dialkylaluminum halide to titanium trichloride complex ordinarily ranges from 1.0:0.005 to 1.0:50.0, preferably 1.0:0.1 to 1.0:10.0.

Although not essential to the conduct of the polymerization, it is often desirable to carry out the polymerization in the presence of elemental hydrogen. When so operating, the amount of hydrogen employed in the polymerization is added in an amount sufficient to provide from 0.15 to 0.40 mol percent hydrogen in the liquid mono-1-olefin phase in the polymerization zone. By operating in this manner, the productivity of the catalyst is increased and certain properties of the polymer, e.g., flexural modulus, are improved.

The diketones suitable for use in the practice of the present invention include alpha-diketones and beta-diketones. These diketones can also be defined as being selected from the group consisting of compounds having the formulas:

(1)

and (2)

wherein R and R' are hydrocarbon radicals, such as alkyl, cycloalkyl and aryl. Examples of suitable alpha-diketones include the following: 2,3-butanedione, 2,3-pentanedione, 3,4-hexanedione, 4-methyl-2,3-pentanedione, 3,4-heptanedione, 5-methyl-2,3-hexanedione, 2,5-dimethyl-3,4-hexanedione, 2,2,5,5-tetramethyl-3,4-hexanedione, 1,2 - cyclopentanedione, 3 - methyl - 1,2 - cyclopentanedione, 1,2-cyclohexanedione, bibenzoyl, bi-2-furoyl, methylphenylglyoxal, phenylbenzylglyoxal, 4,4'-dimethoxybenzil, and the like. The following are examples of suitable beta-diketones: 2,4-pentanedione (acetylacetone), 2,4-hexanedione, 2,4-heptanedione, 5-methyl-2,4-hexanedione, 2,4-octanedione, 5,5-dimethyl-2,4-hexanedione, 3-ethyl-2,4-pentanedione, 3,3-diethyl-2,4-pentanedione, 2,2-dimethyl-3,5-nonanedione, 1-cyclohexayl - 1,3-butanedione, 5,5-dimethyl-1,3-cyclohexanedione, 1-phenyl-1,3-butanedione, 1-(4-biphenylyl)-1,3-butanedione, 1-phenyl-1,3-pentanedione, 1-phenyl-5,5-dimethyl-2,4-hexanedione, 1,3-diphenyl-1,3-propanedione, 1,4-diphenyl-1,3-butanedione, 1-phenyl-2-benzyl - 1,3 - butanedione, 1-phenyl-3-(2-methoxyphenyl)-1,3-propanedione, 1-(4-nitrophenyl)-1,3-butanedione, 1-(2-furyl)-1,3-butanedione, 1-(tetrahydro-2-furyl)-1,3-butanedione, and the like.

A more comprehensive understanding of the invention can be obtained by referring to the drawing which is a flow diagram illustrating a preferred embodiment of the invention. While the drawing is described with regard to a process in which propylene is polymerized with a specific catalyst system, it is to be understood that it is not intended to limit the invention to this specific embodiment. As discussed hereinbefore, the invention is broadly applicable to the treatment of polymers of mono-1-olefins prepared by mass polymerization, utilizing a catalyst capable of polymerizing the monomer to a solid polymer under the conditions employed. As used herein, the term "mass polymerization" is used to designate a polymerization which is conducted with the monomer in liquid phase and without the addition of more than small amounts of an inert diluent. The expression "small amounts of an inert diluent" is intended to mean such amounts of inert diluent as may be introduced into the polymerization zone by way of inert material in the monomer feed and inert diluent employed for ease of handling the catalyst components.

The polymerization process of this invention is carried out at a temperature in the range 105° to 130° F. The pressure employed in the polymerization zone is sufficient to maintain a liquid monomer phase. The residence time for polymerization ordinarily ranges from thirty minutes to twenty hours or longer, preferably from one to five hours.

The conditions employed in conducting the polymerization will vary somewhat depending upon the mono-1-olefin utilized. The polymerization temperature is generally in the range of zero to 160° F. In the polymerization of ethylene, a temperature in the range of zero to 95° F. is usually employed. In the case of propylene, the temperature in the reactor can vary within the range of 90 to 160° F. When polymerizing a higher olefin, such as 1-butene, a lower polymerization temperature is used, e.g., 86° F. or lower. In the polymerization of olefins containing 5 carbon atoms, still somewhat lower temperatures are utilized, e.g., about 75° F. or lower. In general, the polymerization is conducted at a temperature such that solid polymer in particle form is obtained in the polymerization. The actual amount of solid polymer formed is also dependent upon the particular catalyst system used. It has been found that the preferred catalyst system as described above produces a very high percentage of solid polymer with a minimum formation of soluble polymer.

The pressure employed in the reactor is sufficient to maintain the reactants in the liquid phase. The maximum pressure used is only limited by practical considerations, although it is generally undesirable to exceed a pressure of 2,000 p.s.i.g. When polymerizing ethylene, the lower limit of pressure is about 425 p.s.i.g. at a polymerization temperature of about 0° F. In the case of the polymerization of propylene, the lower limit of pressure is about 225 p.s.i.g. at a polymerization temperature of about 90° F. In the case of the higher olefins the pressure will be somewhat lower. The pressure desired in the reactor can be conveniently regulated by an automatic control means. The residence time in the reactor can range from about 1 to about 5 hours, with a residence time of about 3 hours being preferred.

As mentioned above, the present polymerization is conducted in a mass system wherein the proplyene is in liquid phase, and the polymerization is carried out without the addition of more than small amounts of an inert diluent. As is well known, commercially produced propylene ordinarily contains minor amounts, for example, up to 10 percent, of inert materials, for example, paraffinic hydrocarbons, and it is intended that the polymerization of these commercial propylene products is included within the scope of the invention.

Referring now to the drawing, more specifically, a process for polymerizing propylene to form an improved solid propylene homopolymer, is described. Monomer, a catalyst charge comprising a dialkylaluminum halide compound, a titanium trichloride complex, and hydrogen, are fed via conduits 13 and 14, respectively, to a reactor 16, at such a rate so as to provide a reactor effluent stream 17 containing between 500 and 2000 weight units of polypropylene per weight unit of TiCl₃ complex. Reactor 16 is provided with stirrer 18 driven by motor 19, which is operated at such a speed as to thoroughly agitate the contents of the reactor. Reactor 16 is further provided with an external jacket 21 to which a heating medium is introduced through a conduit 22 and withdrawn through conduit 23 so as to maintain the desired polymerization temperature in the reactor. Alternatively, the loop-type reactor of copending application Serial No. 19,007, filed March 31, 1960, may be employed in place of the stirred tank 16.

The reactor effluent passes via conduit 17 to a contacting vessel 24, wherein the chelating agent is added via valved conduit 26. The amount of treating agent added in this manner can range from 1 to 5 times the stoichiometric equivalent based on the amount of catalyst present. Vessel 24 is further provided with a stirrer 27 driven by a motor 28 so that the contents of the vessel can be thoroughly agitated. In one embodiment, the chelating treatment takes place under a high pressure of about 420 p.s.i.a. to maintain the unreacted propylene liquid, even at temperatures ranging from 120° to 140° F. The contact time in tank 28 can vary within rather wide limits, e.g., from 5 minutes to 1 hour in the case of polypropylene. However, it is usually preferred to use a contact in the range of 20 to 30 minutes. In order to maintain the contacting temperature within the prescribed limits, a heat exchanger 29 is provided in conduit 17, for maintaining the reactor effluent in a desired temperature range, as it is fed to vessel 24.

As an alternative and often preferred procedure, line 30 provided with indirect heat exchange means 30a furnishes a means for increasing the temperature in the contact tank. When using this procedure, a low-boiling hydrocarbon is heated in heat exchanger 30a and then passed into the contact tank in order to raise the temperature therein to a desired level. As the low-boiling hydrocarbon, it is usually preferred to employ n-pentane. However, it is within the scope of the invention to use a paraffinic hydrocarbon containing from 3 to 6 carbon atoms per molecule, such as propane or n-hexane. This method of operation is often preferred because it obviates any danger of agglomeration of the polymer particles which may occur when the effluent is directly heated in heat exchanger 28.

The treated effluent is withdrawn from an upper portion of contact tank 24 through line 31 and then passed into the upper portion of wash tank 32. It is preferred to introduce the reactor effluent into a lower portion of the contact tank and to withdraw the treated effluent from an upper portion of the tank since this method of operation ensures good contact between the solid polymer particles and the chelating agent. As shown in the drawing, the wash tank comprises an enlarged upper portion 33a and a smaller lower portion 33b. This type of structure is preferred although it is within the scope of the invention to employ a wash tank having a uniform cross section. Line 34 provides means for introducing wash liquid into the lower portion of the wash tank. Although various light hydrocarbons, particularly paraffinic hydrocarbons containing from 4 to 6 carbon atoms per molecule, such as n-pentane, can be employed as the wash liquid, it is preferred to utilize the monomer, i.e., propylene, for this purpose. Furthermore, because of the improved results obtained with propylene, it is not to be implied that the use of propylene is equivalent to the use of a material such as pentane as the wash liquid. It is also within the scope of the invention to employ a mixture of the monomer and a light hydrocarbon as the wash liquid. The effluent entering the wash tank through line 31 flows downwardly therethrough and contacts the liquid propylene in countercurrent flow. The liquid propylene in contacting the solid polymer removes catalyst residues, and the solid polymer settles into the bottom of the wash tank. This settling of the polymer is facilitated by providing a wash tank with enlarged upper portion 33a. When the wash liquid reaches this portion of the wash tank, its velocity is decreased, thereby causing solid polymer contained in the propylene to fall toward the bottom of the tank. The ratio of the amount of wash liquid to polymer, on a weight basis, is generally in the range of 2:1 to 25:1. Actually, the upper limit is not critical, being limited only by the capacity of the column. However, as regards the lower end of the range, there must be enough wash liquid to provide good contacting and a "hindered" settling effect in the column.

The bottoms stream 35 comprises the solid polymer-liquid propylene slurry which passes to drying, extrusion, and storage zones (not shown).

The overhead stream 36 from wash tank 32 passes through cyclone 37 which separates entrained solid polymer and large particles. The cyclone underflow is returned to column 32 via line 38 and comprises the solid polymer. Stream 36 is withdrawn from wash tank 32 at a rate such as to maintain a predetermined pressure in reactor 16. This is accomplished by means of motor valve 39 positioned in conduit 36. Valve 39 is operatively connected to pressure recorder controller 40 which is preset at the pressure to be maintained in reactor 16. The controller receives a signal from pressure transmitter 41 which is connected to monomer feed line 11. In the operation of the control system, if it is desired to maintain a pressure of 350 p.s.i.g. in reactor 16, controller 40 is given this setting. Now if the pressure in reactor 16 rises to 360 p.s.i.g., pressure transmitter 41 transmits a signal proportional to this pressure to controller 40. Controller 40 then operates motor valve 39 so as to increase the degree of opening of this valve. As a result, the rate of withdrawal of the overhead stream from the wash tank is increased, thereby lowering the pressure in the entire system. When the pressure in reactor 16 has decreased to 350 p.s.i.g., the controller operates valve 39 so that the overhead stream from the wash tank is withdrawn at a rate such as to maintain this pressure. When the pressure in reactor 16 is lower than that which it is desired to maintain, the opposite sequence of events occurs and the amount of the overhead stream withdrawn from the wash tank is decreased.

The temperature maintained in the wash tank is generally somewhat lower that that in the contact tank. This results from the fact that the propylene charged through line 34 is generally at a comparatively low temperature, e.g., 100° F. and below. The pressure maintained in the wash tank is sufficient to maintain the propylene in the liquid phase.

Stream 36a comprises monomer, soluble polypropylene (atactic configuration and low molecular weights), metal chelates formed in vessel 24, excess chelating agent, and hydrochloric acid formed as a decomposition product in the reactor 16, and passes through a fixed bed of solid caustic soda disposed within treating vessel 42.

The constituents of the feed stream, except the monomer, react or are neutralized by the metal hydroxide, providing a waste stream 43 of aqueous alkalies, catalyst, and chelating agent residues, which are passed to disposal. Regarding this waste stream, a motor valve 44 is provided therein, which is operatively connected via line 46 with a level controller 47 communicating with the lower portion of treating vessel 42, permitting controlled draw off.

Vessel 42 is suitably a 2′6″ by 10′ high cylindrical tank, operated at about 100° F. and 320 p.s.i.a. The fixed bed charge is 3500 pounds of solid caustic soda, which should suffice for a several day run, before being shut down for reloading. This charge is predicated on a feed rate to vessel 42 of 365,000 pounds per day, of which about 5,400 pounds is soluble polymer.

The overhead product of vessel 42, comprising soluble polymer substantially free of contaminants, liquid olefin diluent, passes via conduit 48, through heater 49 to an olefin fractionation tower 51, wherein soluble polyolefin and diluent are separated. Tower 51 is suitably a 2′6″ diameter, with 30 aluminum sieve trays with 2′4″ spacing, and is operated at about 275 p.s.i.a. The temperature therein ranges from about 110° F. in the top portion to about 300° F. in the kettle. Vaporized olefin diluent is drawn off about tray 25 and passes via conduit 52 through a cooler 53 to surge drum 54, from whence it is drawn via pump 56 in conduit 57, and recycled to reactor 16 and wash column 32.

The kettle product of tower 52 is drawn by pump 61 disposed in conduit 62 to a flash drum 63. A reboiler 64 is disposed in recycle conduit 66 connecting between stream 62 and kettle portion of tower 52.

Overhead product passes from tower 51 via conduit 67, through condenser 68 disposed therein, and passes to accumulator 69. The vapors pass from drum 69 via conduit 71, having a refrigerated condenser 72 disposed therein, with the light gases being flared. Liquefied monomer is recycled from accumulator 69 via conduit 73 to reflux fractionator 51.

Drug 63 flashes off the light components, such as n-pentane and propylene, which are returned to the fractionator feed conduit 48 via conduit 74. A condenser 76 and pump 77 are disposed in conduit 74 to liquefy said light components before recycle to tower 51. Fresh n-pentane is introduced to the soluble polymer recovery system via conduit 78 for the purpose of reducing the viscosity of the bottoms product from the fractionator 51.

The bottoms product of flash drum 63 comprises a soluble polyolefin product, substantially free of contaminants, such as catalyst residues, which product is passed via conduit 79 to drying and extrusion zones (not shown).

For the purpose of description, reference is made to a particular purification according to the method of this invention. The flow rates of the various streams employed in the aforedescribed process are shown hereinbelow in the table.

*Table I*

| Stream in lb./day | 36a | 43 | 48 | 57 | 62 | 66 | 74 | 79 |
|---|---|---|---|---|---|---|---|---|
| Hydrogen | 40 | | | 40 | 40 | | | |
| Propylene | 323,080 | | 323,080 | 323,080 | 160 | | 160 | |
| Propane | 35,830 | | 35,830 | 35,830 | 50 | | 50 | |
| Acetylacetone | 76 | 76 | | | | | | |
| n-Pentane | 342 | | 342 | 2 | 9,858 | 60 | 9,518 | 400 |
| Soluble Polymer | 4,130 | | 4,130 | | 4,130 | | | 4,130 |
| Polypropylene Catalyst | 900 | | 900 | | 900 | | | 900 |
| Chelates | 466 | 466 | | | | | | |
| HCl | 100 | 100 | | | | | | |
| Caustic (NaOH) | | 500 | | | | | | |
| | 364,964 | 1,142 | 364,322 | 358,952 | 15,098 | 60 | 9,728 | 5,430 |

Various modifications and alterations of this invention will become apparent to those skilled in the art without departing from the scope and spirit of this invention and it should be understood that the latter is not necessarily limited to the aforementioned discussion.

I claim:

1. A process for producing polymers of 1-olefins comprising:
    subjecting at least one 1-olefin in the presence of a metal-containing catalyst formed upon mixing a first component selected from the group consisting of elemental metal, organo metal compounds and mixtures thereof, the metal being selected from Groups I, II and III; and a second component containing a halide of a metal selected from the Groups IV, V, VI and VIII capable of polymerizing said olefins to polymerization conditions;
    treating the polymerization effluent with a compound selected from the group consisting of alpha and beta diketones capable of chelating the catalyst metal;
    washing the treated effluent with a low boiling hydrocarbon under liquid conditions;
    recovering solid polymer substantially free of catalyst residue from the treated effluent;
    treating the remaining effluent by passing same through a fixed bed of solid alkali metal hydroxide; and
    recovering soluble polymer substantially free of catalyst residue.

2. A process for producing polymers of 1-olefins having 2–5 carbon atoms per molecule comprising:
    subjecting at least one of said olefins in the presence of a metal-containing catalyst formed upon mixing a first component selected from the group consisting of elemental metal, organo metal compounds and mixtures thereof, the metal being selected from Groups I, II and III; and a second component containing a halide of a metal selected from the Groups IV, V, VI and VIII capable of polymerizing said olefins to polymerization conditions;

treating the polymerization effluent with a compound selected from the group consisting of alpha and beta diketones to form chelates with the catalyst metals;
washing the treated effluent with a low boiling hydrocarbon under liquid conditions;
recovering solid polymer substantially free of catalyst residue from the washed treated effluent;
passing the remaining effluent through a fixed bed of a solid compound selected from the group consisting of sodium and potassium hydroxide; and
recovering soluble polymer substantially free of catalyst residue.

3. A process for producing polypropylene comprising:
polymerizing propylene in the presence of material which forms upon mixing diethylaluminum chloride and titanium trichloride at a temperature in the range of 105 to 130° F. and sufficient pressure to maintain liquid phase;
mixing the polymerization effluent containing polypropylene, propylene and catalyst residues with acetylacetone at a temperature in the range of 130 to 150° F. and sufficient pressure to maintain a liquid phase;
washing the resulting mixture with liquid propylene;
recovering a first stream containing propylene and solid polypropylene product substantially free of catalyst residue;
passing the remainder of said mixture to a fixed bed zone of solid sodium hydroxide; and
recovering soluble polypropylene product substantially free of catalyst residue.

4. The process of claim 3 wherein a first stream containing aqueous alkali and catalyst residue and a second stream containing polypropylene and propylene are removed from said fixed bed zone, and said second stream is fractionated for separation of said propylene and polypropylene.

5. The method of recovering soluble 1-olefin polymer from a stream containing metal chelates; the chelates being formed upon mixing a compound selected from the group consisting of alpha and beta diketones with said 1-olefin polymer containing residues of material prepared by mixing a first component selected from the group consisting of elemental metal, organo metal compounds and mixtures thereof; the metal being selected from Groups I, II and III; and a second component containing a halide of a metal selected from the Groups IV, V, VI and VIII; comprising passing said stream to a fixed bed zone containing a solid alkali metal hydroxide, withdrawing a first stream from said zone containing aqueous alkali and metal chelates, withdrawing a second stream containing soluble 1-olefin polymer from said zone; and recovering said soluble 1-olefin polymer.

6. The process of claim 5 wherein said second withdrawn stream is fractionated for recovery of said soluble 1-olefin polymer.

References Cited by the Examiner
UNITED STATES PATENTS

| | | | |
|---|---|---|---|
| 2,980,742 | 4/61 | Ross et al. | 260—94.9 |
| 3,002,962 | 10/61 | Claiborne et al. | 260—94.9 |
| 3,020,268 | 2/62 | Schutze et al. | 260—94.9 |
| 3,066,124 | 11/62 | Telfer | 260—93.7 |

JOSEPH L. SCHOFER, *Primary Examiner.*

WILLIAM H. SHORT, *Examiner.*